(12) United States Patent
Harro

(10) Patent No.: US 9,952,345 B1
(45) Date of Patent: Apr. 24, 2018

(54) SUBSURFACE MULTI-ELECTRODE RESISTIVITY IMPLANT METHOD AND SYSTEM

(71) Applicant: David Bruce Harro, Odessa, FL (US)

(72) Inventor: David Bruce Harro, Odessa, FL (US)

( * ) Notice: Subject to any disclaimer, the term of this patent is extended or adjusted under 35 U.S.C. 154(b) by 913 days.

(21) Appl. No.: 14/100,890

(22) Filed: Dec. 9, 2013

Related U.S. Application Data

(60) Provisional application No. 61/735,857, filed on Dec. 11, 2012.

(51) Int. Cl.
*G01V 3/02* (2006.01)
(52) U.S. Cl.
CPC ...................... *G01V 3/02* (2013.01)
(58) Field of Classification Search
None
See application file for complete search history.

(56) References Cited

PUBLICATIONS

Schatze et al., Joint application of geophysical methods and Direct Push-soil gas surveys for the improved delineation of buried fault zones, Journal of Applied Geophysics 82 (2012) 129-136
Schulmeister et al., Direct-Push Electrical Conductivity Logging for High Resolution Hydrostratigraphic Characterization, Ground Water Monitoring & R.*
Schulmeister et al., Direct-Push Electrical Conductivity Logging for High Resolution Hydrostratigraphic Characterization, Ground Water Monitoring & Remediation 23, No. 3, Summer 2003, pp. 52-62.*
Paasche et al., Near-surface seismic traveltime tomography using a direct-push source and surface-planted geophones, Geophysics, vol. 74, Jul.-Aug. 2009, p. g17-g25.*
Pidlisecky et al., Cone-based electrical resistivity tomography, Geophysics, vol. 71, No. 4 Jul.-Aug. 2006; p. G157-G167.*
Ayolabi et al., An application of 2D electrical resistivity tomography in geotechnical investigations of foundation defects: A case study, Journal of Geology and Mining Research vol. 3(12) pp. 142-151, Nov. 2012.*

* cited by examiner

*Primary Examiner* — An Do
*Assistant Examiner* — Renee I Wilson
(74) *Attorney, Agent, or Firm* — H. John Rizvi; Gold & Rizvi, P.A.

(57) ABSTRACT

An electrical resistivity imaging survey performs an investigation of a targeted subsurface site using a system of underground electrode arrays. The arrays are installed at depth within probe channels formed by a direct push drilling process that employs a non-rotational boring action. Each array includes a set of current electrodes to inject current into the subsurface, and a set of potential electrodes to detect a potential difference relating to an electrical field generated by the current. A meter generates a resistivity measurement using the voltage and current values to define a resistivity data point. The collection of data points developed by operation of the array system forms a model representative of the spatial distribution of the subsurface resistivity. By appropriately selecting the penetration depth of the probe channels and the geometric configuration of the electrode arrays, each array is capable of defining a coverage space of investigation by resistivity sounding that is sufficient to interact with the site.

18 Claims, 8 Drawing Sheets

SUBSURFACE MULTI-ELECTRODE RESISTIVITY IMPLANT METHOD AND SYSTEM

CROSS-REFERENCE TO RELATED APPLICATIONS

This Non-Provisional Utility Patent Application claims the benefit of U.S. Provisional Patent Application Ser. No. 61/735,857, filed on Dec. 11, 2012, which is incorporated herein in its entirety.

FIELD OF THE INVENTION

The present invention relates to a method and system for performing an electrical resistivity imaging survey, and more particularly, to a method and system for investigating the resistivity of a subsurface geologic target that employs a conductor array implanted at an underground location, enabling the conductor array to gain closer proximity to the subsurface geologic target and thereby to derive higher resolution resistivity sounding measurements of the target.

BACKGROUND OF THE INVENTION

The standard arrangement for implementing a surface-based multi-electrode resistivity (MER) array involves the insertion of metal probes a few inches into the top surface of the ground. The metal probes are devices such as electrodes or conductors. The information obtained from these arrays functions as a resistivity sounding of the local underground electrical resistance. The resistivity soundings are represented as resistivity data points, which provide a model for the bulk measurement of the soils and rocks in the subsurface. Any variety of subsurface geologic features can be detected or identified on the basis of an analysis of the resistivity model, although limited by the resolution available with the data.

The electrodes are typically connected to an insulated, multi-core cable, which is connected to a switch box for regulating the flow of electricity. A computerized resistivity instrument records and displays the resistivity soundings, typically in the form of resistivity data points. The resistivity data points are then combined to create a model of the subsurface. A laptop is a convenient appliance for implementing the computerized resistivity instrument.

A variety of electrode configurations are used to construct the individual arrays, such as a four electrode combination. In this array arrangement, one pair of electrodes functions as current electrodes since they are used to introduce a direct current into the earth. The other pair of electrodes functions as voltage or potential electrodes since they are used to measure the voltage. This voltage measurement is indicative of the local subsurface resistivity. Surface multi-electrode resistivity arrays employ principles similar to standard Ohm-meters used to test electrical circuits.

One performance metric of the resistivity imaging technique is the depth to which the resistivity sounding activity can reach. A greater depth of investigation into the subsurface is possible by increasing the distances between the electrodes. A protocol generally observed in electrical resistivity procedures is that the depth of investigation is approximately one-fifth (⅕) of the total length of the entire electrode array system positioned on the surface. The electrode arrays are typically organized along a survey line, making it easy to calculate the array length. For example, a one-hundred (100) foot array equals approximately a twenty (20) foot depth of investigation. However, while greater electrode spacing does yield a greater depth of investigation, this benefit comes at the cost of sensitivity and spatial resolution. As the array length increases, the resolution decreases, especially at the lower subsurface levels, because electrical current dissipates more widely as it penetrates deeper into the subsurface.

A typical model for representing the resistivity profile includes an inverted triangle having a wide, uppermost side lying directly at the surface, with the other sides tapering inwards and downwards to a terminal vertex. The resistivity data points are distributed throughout the interior of the triangle and represent the location-specific spatial distribution of the resistivity values in the subsurface region. The upper part of the inverted triangle proximate to the surface includes a greater amount of resistivity data points relative to the lower part of the triangle, due to the depth dependent changes in current dissipation. The resolution of any particular region within the inverted triangle model is a function of the number of resistivity data points contained within the area of interest. Attempts to increase the depth of penetration of the resistivity sounding measurements by increasing the array length have the adverse effect of reducing the overall resolution, since current dissipation is greater. However, opposite attempts to enhance resolution by increasing the density of the resistivity data points require a shortening of the array length, which reduces the depth of penetration and narrows the inverted triangle, resulting in a reduced spread of resistivity data points that compromises the ability of the imaging technique to acquire and detect targets. Accordingly, there is a tradeoff between obtaining the deepest possible resistivity data, while simultaneously trying to yield maximum resistivity data points for optimum resolution.

Based on the collection of resistivity data points represented in the inverted triangle model, an analysis of this profiling model enables the mapping and identification of geologic features, depending on whether the features exhibit higher or lower resistivity values compared to their surroundings. In this way, the presence and form of geologic features can be inferred from the resistivity profile model. For example, a stone foundation might impede the flow of electricity, while the nearby organic deposits might conduct electricity more easily than surrounding soils. Although used in archaeology for plan view mapping, resistance methods nevertheless have a limited ability to discriminate depth and create vertical profiles. Other applications of surface multi-electrode resistivity arrays include the measurement of the electrical resistivity of concrete to determine the corrosion potential in concrete structures.

Surveys to perform resistivity imaging can use any type of electrode array. One common example is the Wenner probe array, which is a linear array of four probes. The Wenner array is arranged current-voltage-voltage-current, at equal distances across the array. Electrodes are mounted on a rigid frame or placed individually. While quite sensitive, this array has a very wide span for its depth of investigation, leading to problems with horizontal resolution. A number of other array configurations attempted to overcome the shortcomings of the Wenner array. One of the most successful of these is the twin-probe array, which has become the standard for archaeological use. The twin-probe array has four probes: one current and one voltage probe mounted on a mobile frame to collect survey readings, and the other current probe placed remotely along with a voltage reference probe. These fixed remote probes are connected to the mobile survey probes by a trailing cable. This configuration is very compact for its depth of investigation, resulting in improved horizontal resolution. The logistical advantage of the more compact array is somewhat offset by the trailing cable. Additionally, a disadvantage of the twin-probe array is a relatively slow rate of survey, since the acquisition of a series of readings at different surface locations requires the mobile frame that houses the array to be moved to each successive location before a new reading can be taken.

An improvement on the slow rate of survey from the twin-probe array has come from the utilization of the wheeled array. The wheeled array uses spiked wheels or metal disks as electrodes, and may use a square array, which is a variation of the Wenner array, to avoid the encumbrance of a trailing cable. Wheeled arrays may be towed by vehicles or driven by human power. Although wheeled arrays do speed up the rate of survey, they cannot always be deployed in crowded urban areas since they require a wide range of mobility.

There are other versions of the standard linear electrode array besides the Wenner array. Systems that have long linear arrays of multiple electrodes are often used in geological applications, and less commonly in archaeology. These longer linear arrays take repeated measurements, often computer controlled, using different electrode spacings at multiple points along the extended line of probes. Data collected in this way may be used for tomography or for generating vertical profiles. Another type of array, different than a resistance based system, can utilize a capacitively coupled interface that does not require direct physical contact with the soil. These systems are capable of tomographic studies as well as mapping horizontal patterning. These capacitive coupling systems may also be used on hard or very dry surfaces that otherwise preclude the type of electrical contact that is necessary for probe resistance systems. While these systems show promise for archaeological applications, currently available systems operating on this capacitive coupling principle lack sufficient spatial resolution and sensitivity.

Accordingly, there remains a need in the art for a method of investigating subsurface geologic targets that employs a multi-electrode resistivity array and that overcomes the drawbacks and limitations of conventional surface-based array arrangements, with the additional objective that the method facilitates the collection of enhanced electrical resistivity data to improve the acquisition, detection and identification of the subsurface targets.

SUMMARY OF THE INVENTION

The present invention overcomes the deficiencies of the known art and the problems that remain unsolved by providing a method and system for performing electrical resistivity imaging.

In accordance with one implementation of the present invention, a method of investigating a subsurface site comprises the steps of:
  obtaining a first plurality of electrodes grouped into a second plurality of electrode arrays each defining an electrode arrangement including a respective set of electrodes from said first plurality of electrodes;
  forming a plurality of subsurface probe channels by using a non-rotary boring process, each probe channel having an appropriate penetration depth associated therewith;
  installing said second plurality of electrode arrays underground by placing said second plurality of electrode arrays into said plurality of subsurface probe channels;
  operating at least one electrode array to generate at least one corresponding resistivity measurement each associated with a respective one of the operating electrode arrays, each electrode array operatively configured to inject current into the subsurface and to detect an electrical potential value relating to an electrical field generated by the injected current;
  generating each respective one of the at least one resistivity measurement by using an indication of the injected current associated with the respective operating electrode array, an indication of the detected electrical potential value associated with the respective operating electrode array, and an indication of a geometric factor associated with the respective operating electrode array; and
  generating a resistivity value characterization of the subsurface site by using the at least one resistivity measurement.

In accordance with another implementation of the present invention, a method of surveying a subsurface comprises the steps of:
  obtaining a plurality of conductors including a plurality of current electrodes and a plurality of potential electrodes;
  obtaining at least one multi-core cable each including a plurality of signal lines each having a first end and a second end;
  connecting each respective one of said plurality of conductors to the first end of a respective signal line of a respective multi-core cable;
  implanting said plurality of conductors into said subsurface at a predetermined subsurface depth by using a non-rotational, tool carriage boring process;
  obtaining an electrical switch system, said electrical switch system configured to controllably select a group of conductors from said plurality of conductors to define a conductor array having a selectable set of current electrodes and a selectable set of potential electrodes, said electrical switch system in signal communication with a current power source;
  connecting said electrical switch system to the second end of each respective signal line of each respective one of said at least one multi-core cable;
  connecting said electrical switch system to a recording device;
  operating the electrical switch system to transmit source current to the selected set of current electrodes in the conductor array defined by the electrical switch system;
  determining a potential value relating to an electrical potential field generated by current injected into the subsurface by the selected set of current electrodes, via the selected set of potential electrodes in the conductor array defined by the electrical switch system;
  receiving at the electrical switch system a potential reading indicative of the potential value determination and a current reading indicative of the transmitted source current;
  the recording device receiving the potential reading and the current reading;
  the recording device deriving a plurality of electrical resistivity data points by using the potential reading, the current reading, and a predetermined geometric factor associated with the conductor array;
  the recording device generating a resistivity profile of said subsurface by using said plurality of electrical resistivity data points; and
  the recording device detecting at least one subsurface geologic target in said subsurface by analyzing said resistivity profile.

In accordance with yet another implementation of the present invention, a system for surveying a subsurface comprises:

a plurality of probe channels formed in the subsurface by operation of a non-rotational hole boring member;

a plurality of conductor arrays each including a respective set of current electrodes and a respective set of potential electrodes, said plurality of conductor arrays installed underground in said plurality of probe channels at a subsurface implant depth;

a current source;

an electrical switch system connected to said current source;

at least one multi-core cable connected to said electrical switch system and connected to said plurality of conductor arrays;

a processor connected to said electrical switch system; and an executable instruction set executable by said processor, said executable instruction set comprising a series of executable steps including:

receiving from the electrical switch system a current reading indicative of a current transmitted to the set of current electrodes of a respective conductor array via the electrical switch system;

receiving from the electrical switch system a potential reading indicative of a potential difference relating to an electrical potential field generated by current injected into the subsurface by the relevant set of current electrodes of the respective conductor array;

deriving a plurality of electrical resistivity data points by using the potential reading, the current reading, and a predetermined geometric factor associated with the respective conductor array; and generating a resistivity profile of said subsurface by using said plurality of electrical resistivity data points.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall be used to describe the invention in accordance with their common meaning. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
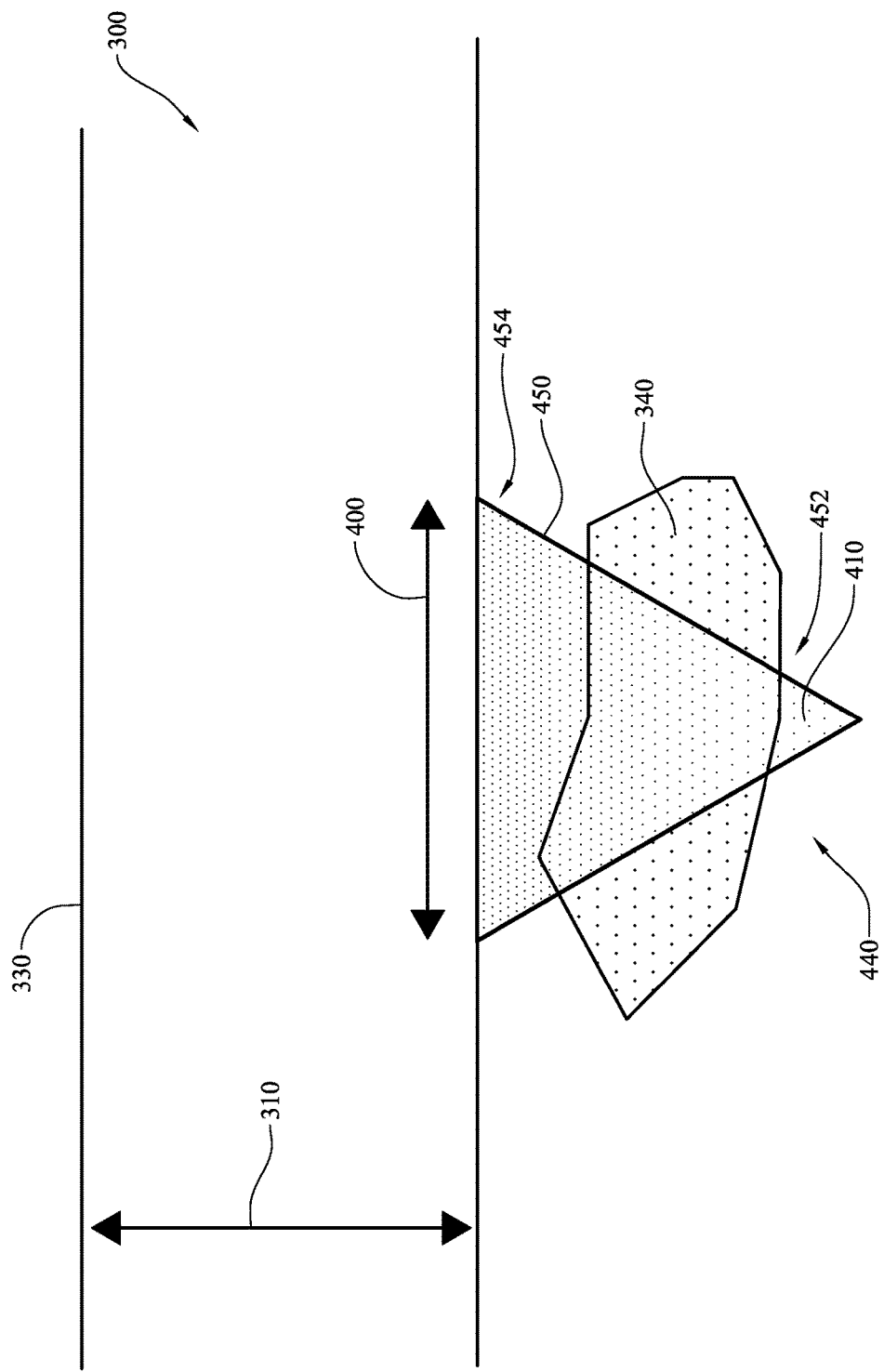
FIG. 2 presents a schematic view of a resistivity measurement profile relative to an underground geologic target of interest, demonstrating the scope and spatial distribution of the profile as it originates and extends from a subsurface location and overlaps with the geologic target, according to one embodiment of the invention.
Figure 3:
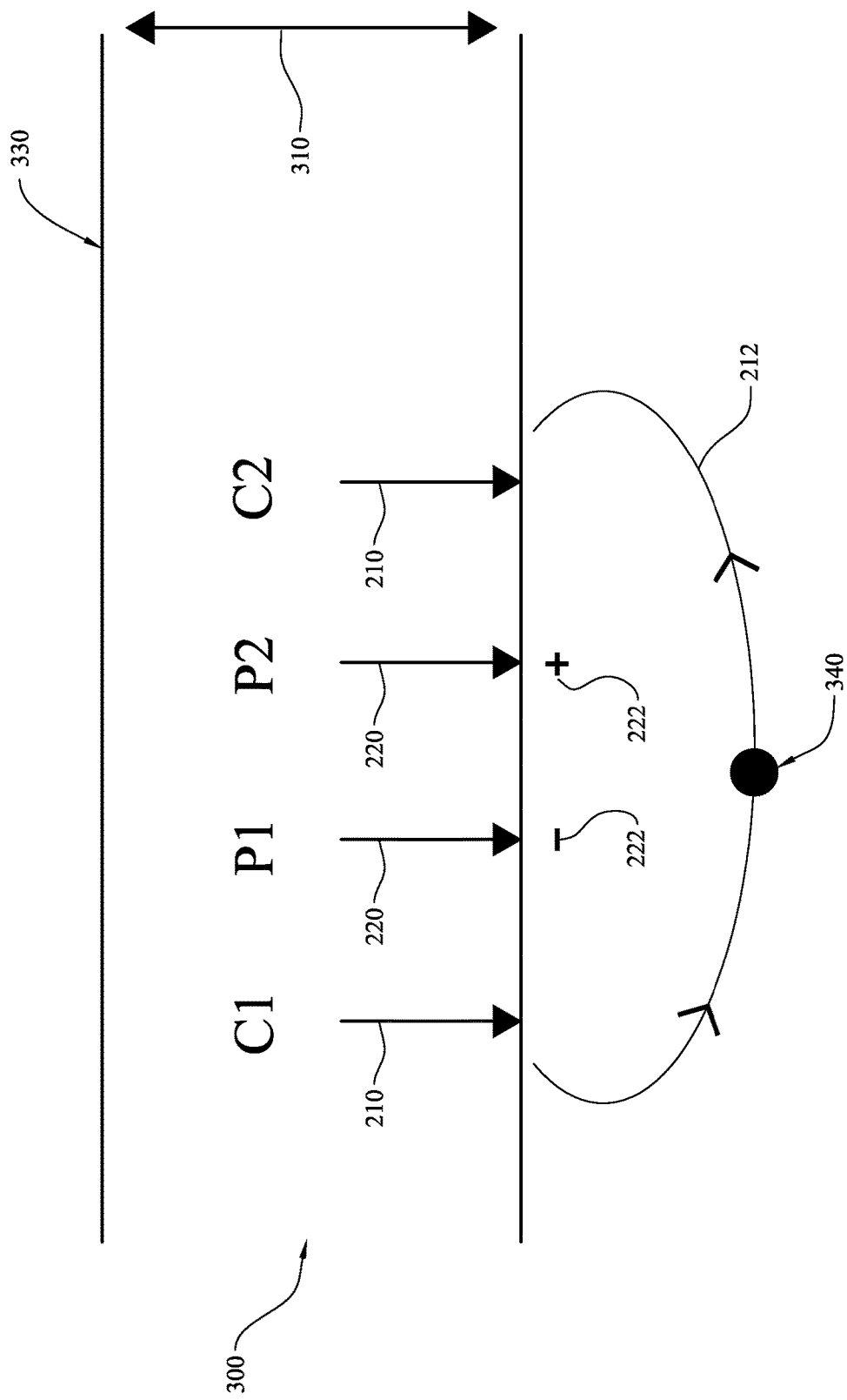
FIG. 3 presents a schematic view of the operation of an exemplary conductor array implanted underground and useful in generating an exemplary one of the resistivity measurement data points that form the resistivity measurement profile originally introduced in FIG. 2, demonstrating how the array operates to inject current into the subsurface and detect the potential field generated by the current.
Figure 4:
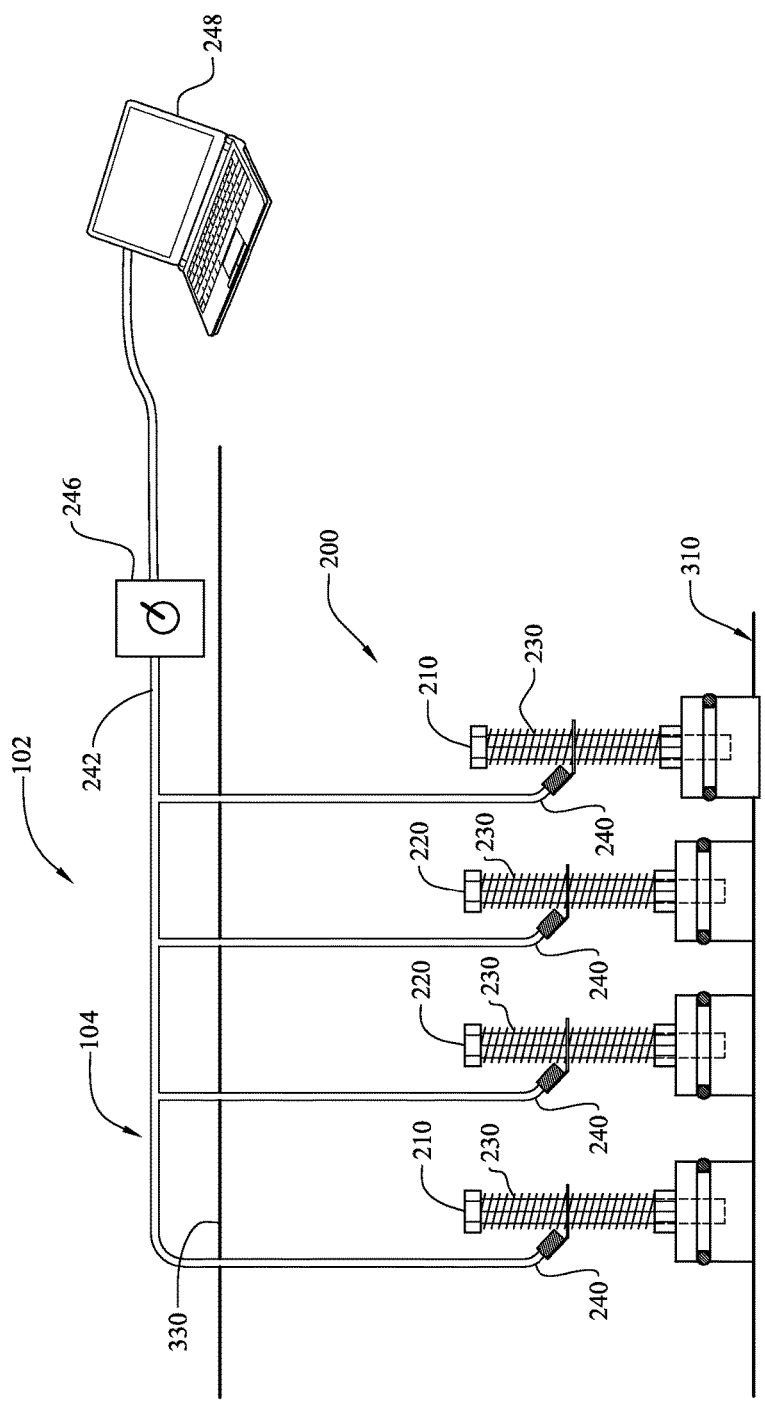
FIG. 4 presents an isometric view of an exemplary implementation of the conductor array originally introduced in FIG. 3, demonstrating in diagrammatic form how the conductor array is integrated with a switching unit and a computerized resistivity meter via a multi-core cable.
Figure 5:
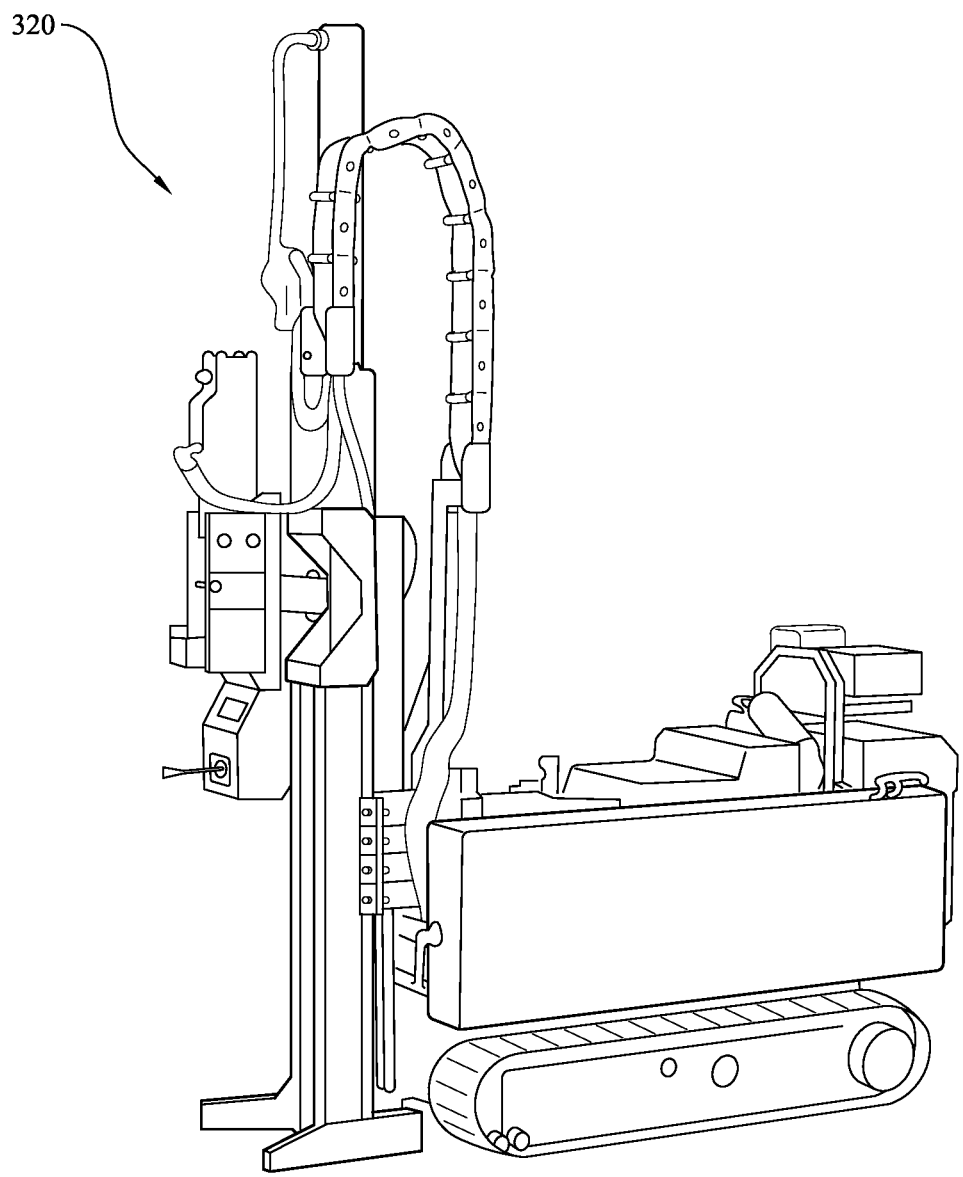
FIG. 5 presents an isometric view of an exemplary drilling machine that utilizes direct push technology to develop boreholes for implanting the conductor array that is variously illustrated in FIGS. 2 through 4, according to another aspect of the invention.
Figure 6:
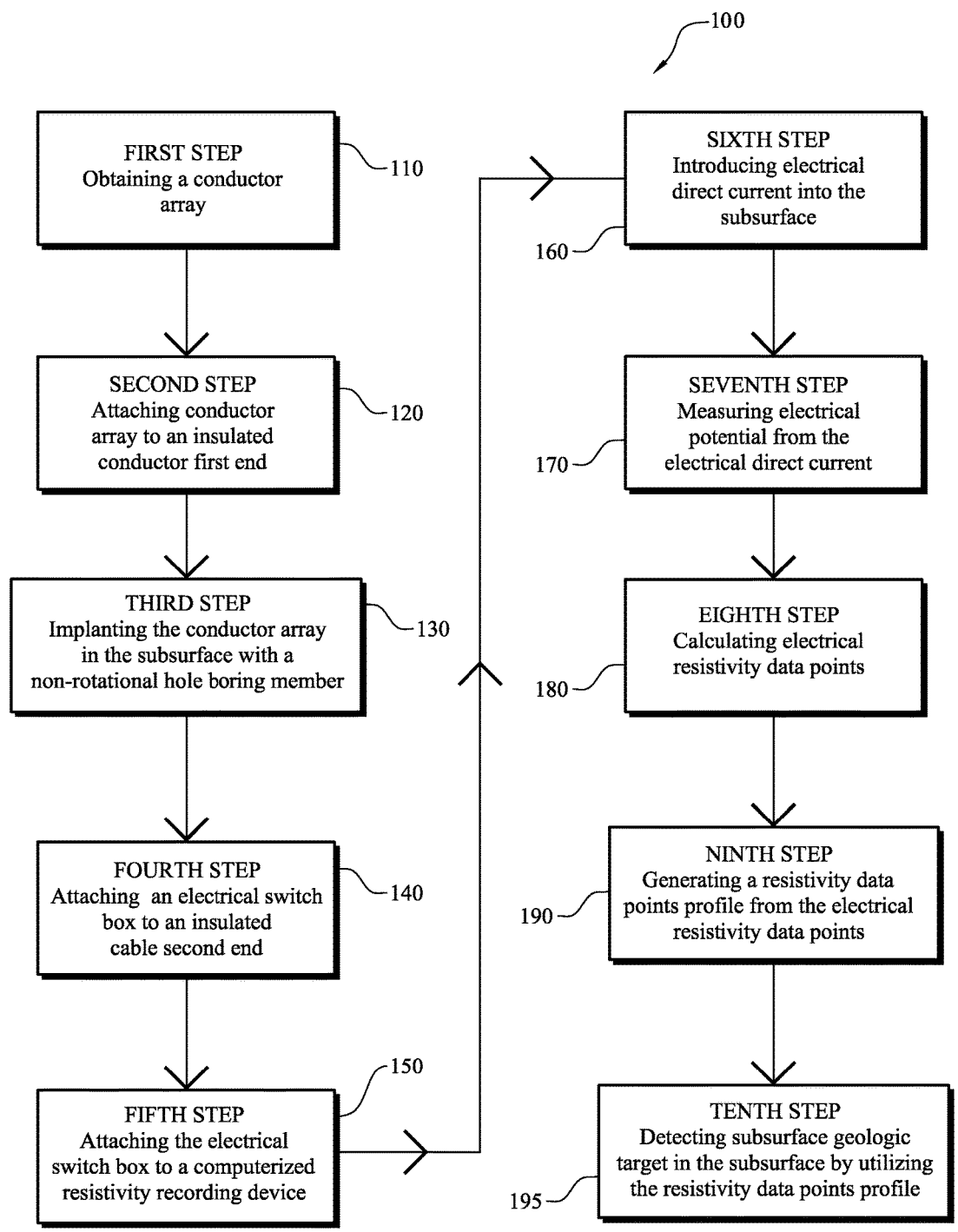
FIG. 6 presents a flow diagram illustrating a process for investigating a subsurface geologic target using an underground system of electrode arrays implanted with the direct push technology originally introduced in FIG. 5, wherein the process is used in conjunction with the embodiments presented in FIGS. 2 through 5.

A flow diagram illustrating a process 100 to perform electrical resistivity imaging of a subterranean region, using an exemplary underground conductor array 200 as shown in FIG. 4 to detect an exemplary subsurface target site 340, is presented in FIG. 6, and described further in conjunction with FIGS. 2 through 7.

A system 102 to perform electrical resistivity imaging of subsurface geologic target 340 includes an exemplary conductor array 200, a multi-core cable 104 provided in signal communication with the conductor array 200, an electrical switch unit 246 provided in signal communication with the multi-core cable 104, and a computerized resistivity recording device or meter 248 provided in signal communication with the electrical switch unit 246 (step 110 of FIG. 6). The conductor array 200 is installed at an underground location or subsurface area 300 at a predetermined depth 310 relative to the ground surface 330, in the proximate vicinity of a geologic target 340 sufficient to enable detection of the geologic target 340 via an electrical resistivity sounding technique.

The exemplary conductor array 200 includes an arrangement of four (4) conductors including a pair of current source electrodes 210 (shown realistically in FIG. 4, and schematically as C1 and C2 in FIG. 3) and a pair of potential measuring electrodes 220 (shown realistically in FIG. 4, and schematically as P1 and P2 in FIG. 3). The pair of current electrodes 210 function in a transmit-receive or source-sink arrangement to inject current into the ground, as depicted in FIG. 3 as illustrative current flow 212 passing through the subsurface target 340. A power source or current generator is connected to the electronic switch unit 246. The electronic switch unit 246 connects this power source to the current electrodes 210 via the multi-core cable 104. The switch unit 246 regulates the flow of electricity to and from the conductor array 200, specifically the pair of current electrodes 210.

The potential electrodes 220 detect and measure the potential difference 222 of an electrical potential field generated by the injected current 212. This measured potential difference 222 is received by the switch unit 246 via the multi-core cable 104, and then communicated to the recording device 248. The conductor array 200 is characterized by the specification of an exemplary array length 400, as depicted in FIG. 2. In the illustrated implementation, the array length 400 is a distance between the two extreme ends of the conductor array 200, as defined by the pair of current conductors 210.

Any type of electrode arrangement can be used to implement conductor array 200. For example, there are different possible combinations, spacing, and numbers of conductors depending on the type of array utilized, including, without limitation, a resistance type array, a Schlumberger array, a Wenner probe array, a twin probe array, a dipole-dipole array, a pole-dipole array, a pole-pole array, SP measurements, SP absolute, SP Gradient, Induced potential, and an equatorial array. Additionally, while the exemplary conductor array 200 employs a pair of current electrodes 210 at extreme ends of the linear array 200, it is possible to use any other suitable geometric configuration, such as an alternating electrode arrangement having a current-potential-current-potential ordering positioned at equal distances across the array.

Although a single conductor array 200 is shown, this exemplary implementation is merely illustrative and should not be considered in limitation of the invention, as it should be apparent that any number of conductor arrays 200 can be used. For this purpose, system 102 will include an appropriate number of multi-core cables 104 sufficient to connect all of the conductor arrays 200 to switch unit 246. The system 102 can be built with a plurality of individual conductors that are further configured as a plurality of current electrodes and a plurality of potential electrodes. The switch unit 246 is connected to each of the conductors via an appropriate multi-core cable 104. The switch unit 246 has a selection capability that enables it to selectively energize any suitable set of current electrodes, and to selectively employ any grouping or combination of potential electrodes to measure the potential difference relating to an electrical potential field generated by the injected current. In this manner, the switch unit 246 can select different sets of potential electrodes to measure the potential difference at different locations and thereby provide a more robust measurement procedure.

Prior to the underground installation, the conductor array 200 is connected to the multi-core cable 104. The conductor array 200 is attached to the multi-core cable 104 via an insulated cable first end 240 (step 120 of FIG. 6). In particular, each one of the pair of current electrodes 210 and the pair of potential electrodes 220 is connected to a dedicated signal line of the multi-core cable 104 via a corresponding insulated cable first end 240 associated with the respective cable signal line. The attachment can be completed by any suitable technique, such as a crimp or solder procedure. The conductor array 200, now in connection with the multi-core cable 104, is ready for underground installation.

Figure 7:
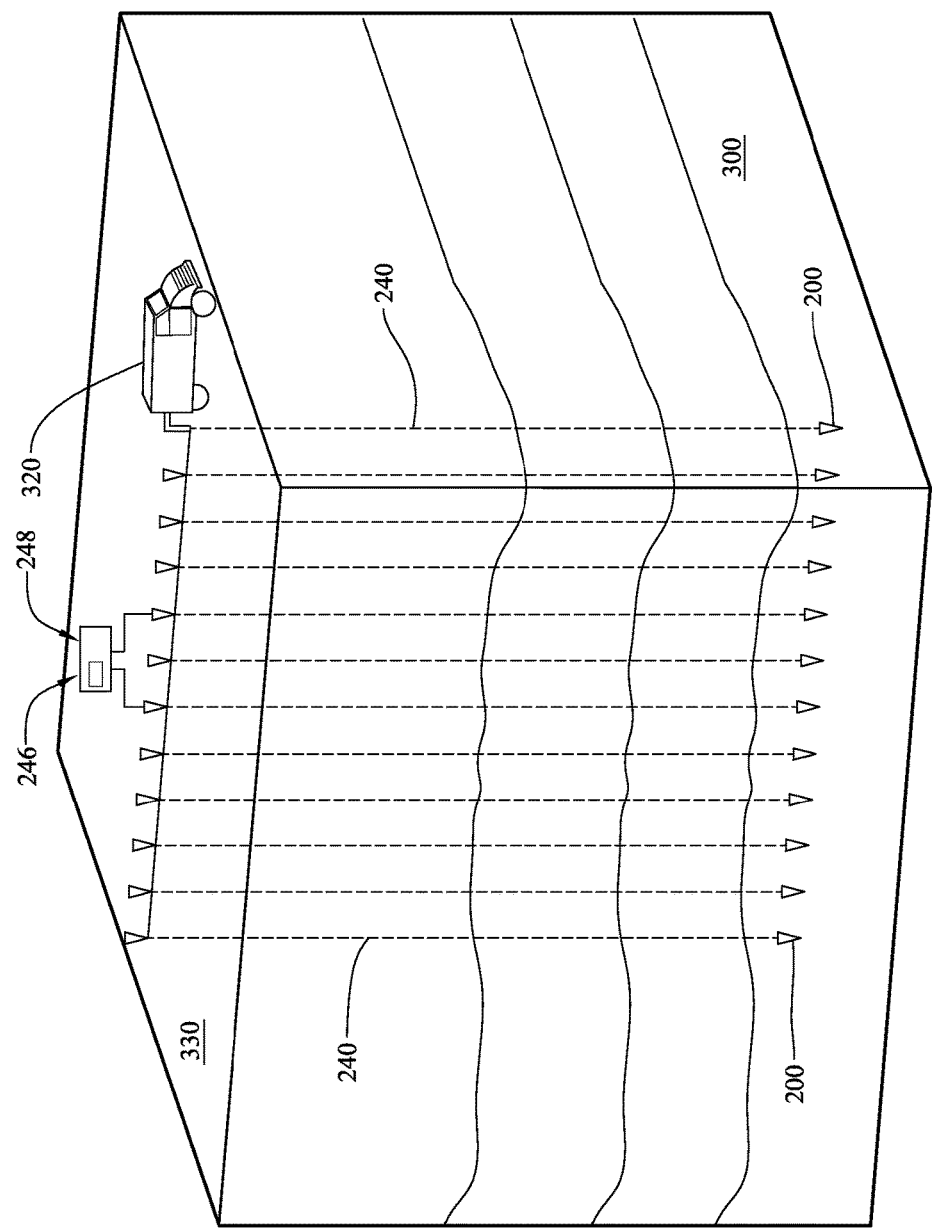
FIG. 7 presents an isometric sectional view of an installation environment for the conductor array variously described in FIGS. 2 through 6, demonstrating the underground installation of the conductor arrays using the direct push technology as implemented by the exemplary drilling machine originally introduced in FIG. 5.

A drilling machine 320 that deploys direct push technology is used to create the boreholes or probe channels needed to install the conductor array 200 at the subsurface depth 310, as presented in FIGS. 5 and 7, according to one aspect of the invention. Direct-Push Technology (DPT) is based on the use of probes that are driven into the ground by a static drive source (hydraulic push), a hammer drive source (pneumatic, drop or hydraulic), a vibration drive source or a combination of these. With DPT, depth profiles of physical or chemical parameters can be measured, samples can be taken, and equipment for sampling or measurements can be installed. DPT can be used especially in nonconsolidated underground for the investigation of geologic formations. As soil material is only pushed sideways with the propulsion and advancement of the probe, there is no waste of soil material. The direct push drilling or boring process is less intrusive and faster at creating a borehole than rotational drills.

Direct push technology includes several types of drilling rigs and drilling equipment that advance a drill string, often containing a steel rod, into the subsurface by pushing or hammering, and without rotating the drill string. No rotation is involved, but there is significantly more mechanical vibration on the drill string. Direct push technology is less intrusive and faster than other subsurface drilling techniques. The direct push action produces a borehole. Direct push technology can be utilized for inserting sensitive equipment like electrodes deep underground if certain precautions are taken, for example, the use of spring dampening electrical connections. The use of direct push technology would prove efficacious in crowded urban areas where the array length has to be limited due to limited space. In particular, a direct push boring process is beneficial in crowded urban environments where space is at a premium and the array length is correspondingly constrained.

The drilling machine 320 employs a non-rotational hole boring member, such as a direct push drill, to form the probe channel. The drilling machine 320 is equipped with a tool carriage structure that temporarily receives, holds, and carries a tool intended for installation in the probe channel, for example, the conductor array 200. During the initial setup, the tool or instrumentation that will be inserted and deposited into the probe channel is placed into the tool carriage structure of the drilling machine 320. During operation, as the hole boring member of the drilling machine 320 penetrates into the ground subsurface and gradually progresses downwards to form the probe channel, the instrumentation is simultaneously carried downwards into the emerging probe channel by the tool carriage structure and advances with the progression of the hole boring member. Once the desired depth of the probe channel is reached, the carried instrumentation is deposited into the probe channel and the drilling machine 320 is withdrawn from the probe channel.

The conductor array 200 is implanted into a corresponding probe channel at the predetermined depth 310 by the direct push drilling machine 320 (step 130 of FIG. 6). The installed position of conductor array 200 is depicted in FIG. 4. The conductor array 200 is accessible from above ground (i.e., via the switch unit 246 and recording device 248) because the multi-core cable 104 was first attached to the conductor array 200 prior to executing the underground installation of the conductor array 200, so that the first end 240 of multi-core cable 104 accompanied the conductor array 200 as it was advanced into the probe channel by the direct push drilling machine 320.

Once the conductor array is installed, each electrode in the conductor array 200 is connected to the switch unit 246 via an insulated second end 242 of a dedicated signal line of multi-core cable 104 (step 140 of FIG. 6). The second end 242 of multi-core cable 104 is opposite the first end 240 that is directly connected to the electrode of the conductor array 200. Once the installed conductor arrays 200 are connected to the switch unit 246, the switch unit 246 is then connected to the computerized resistivity recording device 248 (step 150 of FIG. 6). The system 102 is now ready for operation, specifically to perform the generation, collection, and processing of resistivity measurements on the subsurface 300 with a view towards detecting the subsurface geologic target 340.

The installation of a plurality of conductor arrays 200 along a survey line by the direct push drilling machine 320 is presented in FIG. 7. The drilling machine 320 moves along the path of a survey line at the ground surface 330 and forms a plurality of probe channels in the subsurface 300, implanting or depositing a dedicated conductor array 200 into each probe channel. The implanted and installed conductor arrays 200 are connected to the switch unit 248 and the recording device 248 located above ground by the multi-core cable 240, which is connected to the installed conductor array 200 and trails out of the probe channel.

The switch unit 246 is activated to relay electromagnetic energy (current power) to the current electrodes of the conductor array 200, causing the current electrodes to emit or inject a predetermined amount of current into the subsurface 300 (step 160 of FIG. 6). An ammeter attached to the switch unit 246 provides a current reading (i.e., amperage value) that is supplied to the recording device 248. Due to the underground location of the conductor array 200 at depth 310, the emitted current 212 (shown in FIG. 3) has a deeper starting point under the ground surface 330 than that available in conventional resistivity imaging techniques that deploy electrodes at the surface (such as the technique of FIG. 1). As a result, since the underground conductor array 200 is now comparatively closer to the subsurface geologic formation 340 than a surface array, there is a much greater likelihood that the emitted current 212 will access and interact with the geologic target 340, as depicted in FIG. 3. The penetration depth 310 of the installed conductor array 200 is suitably chosen in order to favor the possibility that the emitted current 212 will access the geologic target 340, preferably in a manner that enhances the resolution of the resistivity data points that image the geologic target 340.

The emitted current 212 generates an electrical potential field in the subsurface 300. The potential electrodes of the conductor array 200 detect a potential difference relating to this electrical potential field (step 170 of FIG. 6). The switch unit 246 receives the detected potential difference from the conductor array 200 via the multi-core cable 104. A voltmeter attached to the switch unit 246 provides a voltage or potential difference measurement based on the detected potential difference. The switch unit 246 communicates this voltage measurement reading to the recording device 248.

The recording device 248 derives a plurality of electrical resistivity data points based on the current readings (measurement of injected current) and the voltage readings (measurement of detected potential difference) received from the switch unit 246 (step 180 of FIG. 6). Each resistivity data point defines a value of a resistivity sounding measurement in the subsurface 300, and is calculated on the basis of the injected current value, the detected potential difference relating to the electrical potential field generated by the injected current, and a predetermined geometric factor relating to the associated electrode array. The geometric factor is an attribute or parameter of the electrode array. Each operation or activation of the conductor array 200 produces a set of current readings and voltage readings that yield a corresponding resistivity data point. The calculation of the resistivity measurements can use the principles of Ohm's Law and is well known to those skilled in the art. The recording device 248 is preferably configured as a computer device, such as a laptop. The recording device 248 performs all of the processing, calculating, and analyzing operations relating to the resistivity data points.

The recording device 248 processes the plurality of resistivity data points and generates a resistivity profile 440 of the subsurface 300, and specifically a resistivity profile of the subsurface geologic target 340 (step 190 of FIG. 6). The resistivity profile can be represented in the form of an inverted triangle model 450, as shown in FIG. 2. The inverted triangle model 450 contains the plurality of resistivity data points 410. The inverted triangle model 450 includes an uppermost side and a pair of opposing sides that depend downwardly toward a lowermost vertex. The uppermost side lies at the penetration depth 310 of the conductor array 200, and resides comparatively more proximate to a ground surface 330 than the lowermost vertex. As shown, the inverted triangle 450 occupies a space that spans, overlaps, intersects, and otherwise encompasses at least a portion of the subsurface site 340. The inverted triangle 450 is a model representation of the spatial distribution or locality of the electrical resistivity measurements.

The inverted triangle model 450 is also characterized by a wide upper area 454 and a comparatively narrow lower area 452. The wide upper area 454 is located in greater proximity to the ground surface 330 than the narrow lower area 452. The inverted triangle model 450 defines the spatial distribution of the resistivity data points 410 as a function of depth within the subsurface region 300. A measure of the density of the electrical resistivity data points 410 in the inverted triangle model 450 progressively decreases as a function of depth in a direction from the wide upper area 454 to the narrow lower area 452. This density feature demonstrates a higher density or quantity of resistivity data points 410 in the wide upper triangle area 454, compared to the narrow lower area 452. This wide upper area 454, then, is the spatial area of the inverted triangle model 450 that offers the greatest resolution. The greater concentration of electrical resistivity data points 410 in the wide upper area 454, relative to the narrow lower area 452, occurs because electrical energy dissipates the further it travels into the subsurface 300.

The task of acquiring and detecting the subsurface geologic target 340 by resistivity sounding (e.g., resistivity imaging or tomography) is enhanced by attempts to ensure that the highest-resolution area of the inverted triangle model 450 (i.e., wide upper area 454) encompasses as much of the target 340 as possible. Since the resistivity data points profile 440 is a model representation of resistivity soundings deep in the subsurface 300, the resolution, or number of electrical resistivity data points 410, of the resistivity data points profile 440 can be tailored to the appropriate depth, so that the highest resolution is offered near a subsurface geologic target 340, specifically via the wide upper area 454 of the inverted triangle model 450.

At least two factors contribute to attempt at managing the spatial relationship of the inverted triangle model 450 relative to the subsurface geologic target 340. The particular arrangement of the electrodes in the conductor array 200 influences the shape of the inverted triangle model 450. In particular, the depth of investigation (vertical sounding distance) afforded by the conductor array 200 depends on the length 400 of the linear array 200. A conventional metric computes the depth of investigation or penetration at twenty percent (20%) of the array length 400. Accordingly, the vertical extent of the inverted triangle model 450, taken as a distance between the uppermost side to the lowermost vertex, will depend on the array length 400. The penetration depth 310 of the probe channels will determine the subsurface level at which the inverted triangle model 450 begins, namely, the level at which the uppermost side of the inverted triangle model 450 will lie.

Together, the penetration depth 310 and the geometric configuration of the conductor array 200 will determine the location, shape, and span of the inverted triangle model 450. The choices made to determine these factors are coordinated to ensure that a proper inverted triangle model 450 is created. The objective is to locate the inverted triangle model 450 to a position as close to the target 340 as possible. One aim, for example, is to optimize the degree to which the wide upper area 454 of the inverted triangle model 450, the area of highest resolution, overlaps with the subsurface site 340. In one form, a preliminary operation is performed to suitably configure the direct push, non-rotary boring process with respect to selecting the penetration depths of the plurality of probe channels, and to suitably configure the electrode arrangements of the plurality of electrode arrays 200, such that the installed electrode arrangements each define a coverage space of investigation by electrical resistivity sounding that is sufficient to access and otherwise interact with at least a portion of the subsurface site 340.

Figure 1:
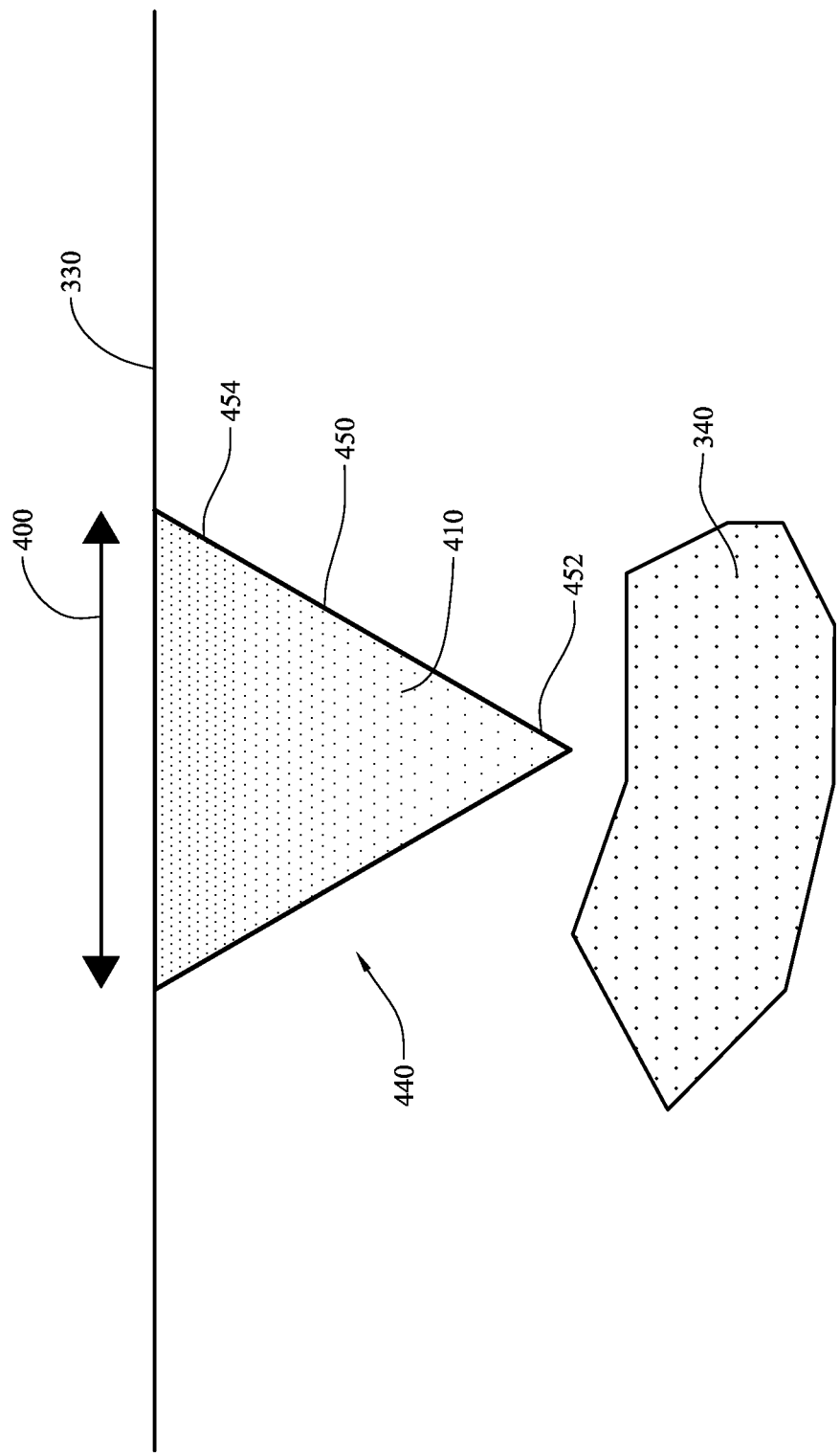
FIG. 1 presents a schematic view of a resistivity measurement profile relative to an underground geologic target of interest, demonstrating the scope and spatial distribution of the profile as it originates and extends from the ground surface, according to a conventional surface-based survey technique.

The inverted triangle model 450 of the invention (shown in FIG. 2) compares favorably to the model offered by surface-based resistivity measurement systems (such as that of FIG. 1). As shown in FIG. 1, the inverted triangle model, because it must extend from the ground surface 330, is limited in its ability to make deeper resistivity soundings, even to the point that the inverted triangle model does not yield any resistivity data points indicated of the target 340. In particular, FIG. 1 demonstrates a subsurface target 340 that lies fully beneath, and hence completely undetected by, the conventional inverted triangle model.

Once the resistivity data point profile 440 is developed by the computer-based recording device 248, such as in the form of the inverted triangle model 450, the recording device 248 analyzes the resistivity profile 440 to determine the resistivity-indicative features of the subsurface geologic target 340 (step 195 of FIG. 6). In this manner, the subsurface target formation 340 can be detected and identified. The enhanced resolution of the resistivity data point profile 440 facilitates a quicker and more accurate detection of the target 340 at a deeper target depth 310 than is possible with a conventional surface array that is implanted only a few inches into the ground surface 330.

Although FIG. 6 shows a specific order of executing functional logic blocks, the order of executing the blocks may be changed relative to the order shown. Also, two or more blocks shown in succession may be executed concurrently or with partial concurrence. Certain blocks may also be omitted for the sake of brevity. And some blocks are merely exemplary steps in an exemplary implementation, but are not required in order to be in accordance with the present invention.

Figure 8:
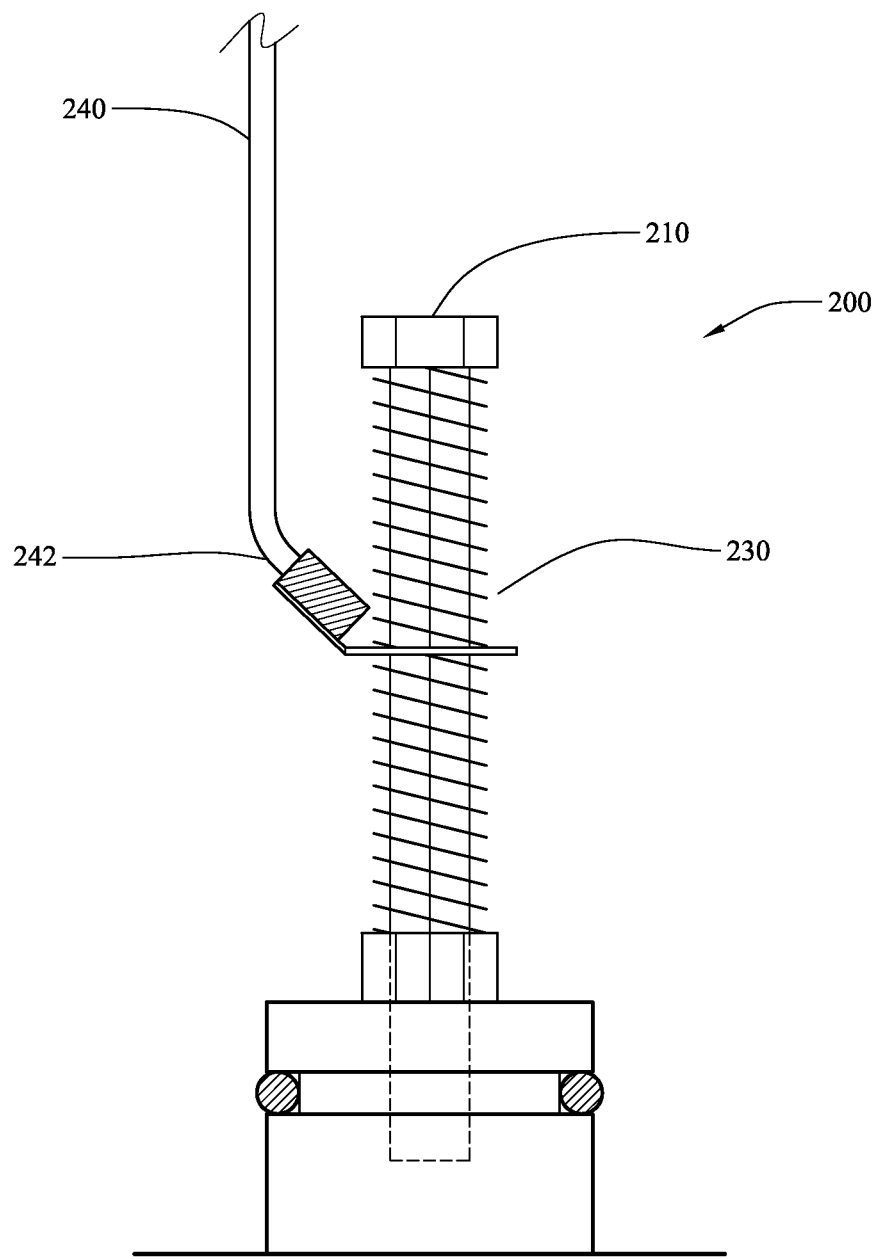
FIG. 8 presents an elevated side view of an individual electrode from the exemplary conductor array depicted in FIG. 4, demonstrating the use of a spring damping device, according to another aspect of the invention.

A spring dampener 230 for reducing vibrations in the conductor array 200 is presented in FIGS. 4 and 8. Each electrode 210 and 220 is fitted or equipped with a spring dampener 230 to reduce the effect of mechanical vibrations that the electrodes experience as the conductor array 200 is carried by the non-rotational hole boring member of the drive push machine 320 during installation (implantation) of the conductor array 200 into the probe channel. The spring dampener 230 coils around the electrical current conductors 210 and the electrical potential conductors 220.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A method of investigating a subsurface site, said method comprising the steps of:

obtaining a first plurality of electrodes grouped into a second plurality of electrode arrays each defining an electrode arrangement including a respective set of electrodes from said first plurality of electrodes;

forming a plurality of subsurface probe channels by using a non-rotary boring process, each probe channel having an appropriate penetration depth associated therewith;

installing said second plurality of electrode arrays underground by placing said second plurality of electrode arrays into said plurality of subsurface probe channels;

operating at least one electrode array to generate at least one corresponding resistivity measurement each associated with a respective one of the operating electrode arrays, each electrode array operatively configured to inject current into the subsurface and to detect an electrical potential value relating to an electrical field generated by the injected current;

generating each respective one of the at least one resistivity measurement by using an indication of the injected current associated with the respective operating electrode array, an indication of the detected electrical potential value associated with the respective operating electrode array, and an indication of a geometric factor associated with the respective operating electrode array;

generating a resistivity value characterization of the subsurface site by using the at least one resistivity measurement
wherein said installing step further comprises a step of:
advancing each respective one of said second plurality of electrode arrays into a respective subsurface probe channel concurrently with the formation of the respective subsurface probe channel.

2. The method of claim 1, further comprising a step of:
suitably configuring the non-rotary boring process with respect to the penetration depths of said plurality of probe channels and suitably configuring the electrode arrangements of said second plurality of electrode arrays, such that the installed electrode arrangements each define a coverage space of investigation by electrical resistivity sounding that is sufficient to interact with at least a portion of said subsurface site.

3. The method of claim 1, wherein said forming step further comprises a step of:
operating a direct push machine to execute the non-rotary boring process.

4. The method of claim 1, further comprising a step of:
inferring at least one feature of said subsurface site by analyzing the resistivity value characterization.

5. The method of claim 4, wherein said inferring step further comprises a step of:
determining an identity of said subsurface site.

6. The method of claim 1, further comprising a step of:
configuring each respective one of said first plurality of electrodes with a respective corresponding spring dampener to inhibit any vibrational effects experienced by the respective electrode during installation.

7. The method of claim 1, further comprising steps of:
obtaining a direct push machine including a tool carriage having an input configured to receive a tool;
performing the probe channel forming step and the electrode array installing step, relative to each respective one of said second plurality of electrode arrays, by:
configuring the direct push machine to receive the respective electrode array at the tool carriage input thereof;
operating the direct push machine to form a respective probe channel; and
depositing the respective electrode array into the probe channel upon completion of the formation of the respective probe channel.

8. The method of claim 1, wherein said step of generating the resistivity value characterization of the site further comprises steps of:
developing a model representative of a spatial distribution profile of subsurface resistivity values by using the at least one resistivity measurements; and
describing the model as an inverted triangle containing a plurality of data points each corresponding to a respective resistivity measurement, the inverted triangle having an uppermost side and a pair of opposing sides depending downwardly toward a lowermost vertex, the uppermost side residing comparatively more proximate to a ground surface than the lowermost vertex, wherein the inverted triangle occupies a space that encompasses at least a portion of the subsurface site.

9. The method of claim 1, wherein said step of generating the resistivity value characterization of the site further comprises steps of:
defining the at least one resistivity measurement as a corresponding plurality of electrical resistivity data points; and
representing the plurality of electrical resistivity data points as an inverted triangle model, said inverted triangle model defined by a wide upper area and a comparatively narrow lower area, said wide upper area located in greater proximity to a surface than said narrow lower area, a measure of the density of said electrical resistivity data points in said inverted triangle model progressively decreasing as a function of depth in a direction from said wide upper area to said narrow lower area.

10. A method of investigating a subsurface site, said method comprising the steps of:
obtaining a first plurality of electrodes grouped into a second plurality of electrode arrays each defining an electrode arrangement including a respective set of electrodes from said first plurality of electrodes;
forming a plurality of subsurface probe channels by using a non-rotary boring process, each probe channel having an appropriate penetration depth associated therewith;
installing said second plurality of electrode arrays underground by placing said second plurality of electrode arrays into said plurality of subsurface probe channels;
operating at least one electrode array to generate at least one corresponding resistivity measurement each associated with a respective one of the operating electrode arrays, each electrode array operatively configured to inject current into the subsurface and to detect an electrical potential value relating to an electrical field generated by the injected current;
generating each respective one of the at least one resistivity measurement by using an indication of the injected current associated with the respective operating electrode array, an indication of the detected electrical potential value associated with the respective operating electrode array, and an indication of a geometric factor associated with the respective operating electrode array;
generating a resistivity value characterization of the subsurface site by using the at least one resistivity measurement; and
configuring each respective one of said first plurality of electrodes with a respective corresponding spring dampener to inhibit any vibrational effects experienced by the respective electrode during installation.

11. The method of claim 10, further comprising a step of:
suitably configuring the non-rotary boring process with respect to the penetration depths of said plurality of probe channels and suitably configuring the electrode arrangements of said second plurality of electrode arrays, such that the installed electrode arrangements each define a coverage space of investigation by electrical resistivity sounding that is sufficient to interact with at least a portion of said subsurface site.

12. The method of claim 10, wherein said forming step further comprises a step of:
operating a direct push machine to execute the non-rotary boring process.

13. The method of claim 10, further comprising a step of:
inferring at least one feature of said subsurface site by analyzing the resistivity value characterization.

14. The method of claim 13, wherein said inferring step further comprises a step of:
determining an identity of said subsurface site.

15. The method of claim 10, wherein said installing step further comprises a step of:
advancing each respective one of said second plurality of electrode arrays into a respective subsurface probe channel concurrently with the formation of the respective subsurface probe channel.

16. The method of claim 10, further comprising steps of:
obtaining a direct push machine including a tool carriage having an input configured to receive a tool;
performing the probe channel forming step and the electrode array installing step, relative to each respective one of said second plurality of electrode arrays, by:
configuring the direct push machine to receive the respective electrode array at the tool carriage input thereof,
operating the direct push machine to form a respective probe channel; and
depositing the respective electrode array into the probe channel upon completion of the formation of the respective probe channel.

17. The method of claim 10, wherein said step of generating the resistivity value characterization of the site further comprises steps of:
developing a model representative of a spatial distribution profile of subsurface resistivity values by using the at least one resistivity measurements; and
describing the model as an inverted triangle containing a plurality of data points each corresponding to a respective resistivity measurement, the inverted triangle having an uppermost side and a pair of opposing sides depending downwardly toward a lowermost vertex, the uppermost side residing comparatively more proximate to a ground surface than the lowermost vertex, wherein the inverted triangle occupies a space that encompasses at least a portion of the subsurface site.

18. The method of claim 10, wherein said step of generating the resistivity value characterization of the site further comprises steps of:
defining the at least one resistivity measurement as a corresponding plurality of electrical resistivity data points; and
representing the plurality of electrical resistivity data points as an inverted triangle model, said inverted triangle model defined by a wide upper area and a comparatively narrow lower area, said wide upper area located in greater proximity to a surface than said narrow lower area, a measure of the density of said electrical resistivity data points in said inverted triangle model progressively decreasing as a function of depth in a direction from said wide upper area to said narrow lower area.

* * * * *